United States Patent
Won et al.

(10) Patent No.: US 7,145,935 B2
(45) Date of Patent: Dec. 5, 2006

(54) APPARATUS FOR MEASURING SIGNAL-TO-INTERFERENCE RATION IN MULTIPLE ANTENNA HIGH DATA RATE PACKET TRANSMISSION SYSTEM AND METHOD THEREOF

(75) Inventors: Seouk Ho Won, Daejon (KR); Deuk Su Lyu, Daejon (KR); Jae Min Ahn, Gyeonggi-do (KR); Whan Woo Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 743 days.

(21) Appl. No.: 10/331,593

(22) Filed: Dec. 30, 2002

(65) Prior Publication Data

US 2004/0071202 A1   Apr. 15, 2004

(30) Foreign Application Priority Data

Oct. 14, 2002   (KR) .............................. 2002-62484

(51) Int. Cl.
  H04L 27/30   (2006.01)
(52) U.S. Cl. ...................... 375/144; 375/148; 375/349; 370/252; 455/67.3; 455/226.3; 455/296
(58) Field of Classification Search ................ 375/130, 375/141, 142, 144, 148, 150, 152, 343, 346, 375/349; 370/252, 320, 335, 342, 465, 479; 455/63, 67.1, 67.3, 226.2, 226.3, 296
See application file for complete search history.

(56) References Cited

U.S. PATENT DOCUMENTS 4,835,790 A   5/1989   Yoshida et al.
6,028,894 A   2/2000   Oishi et al.
6,034,952 A   3/2000   Dohi et al.
6,373,878 B1   4/2002   Palenius et al.

(Continued)

FOREIGN PATENT DOCUMENTS

KR   1999-0043692   6/1999
KR   2001-80255   8/2001
KR   2001-101615   11/2001

OTHER PUBLICATIONS

Ericsson, "Proposal for downlink interference measurment method, revised" TSG-RAN Working Group 1 meeting #5, 6 pages.

(Continued)

*Primary Examiner*—Dac V. Ha
(74) *Attorney, Agent, or Firm*—Blakely Sokoloff Taylor & Zafman

(57) ABSTRACT

A Signal-to-interference ratio (SIR) measuring apparatus in a multiple antenna high data rate packet transmission system measures signal energy to interference energy ratio by using pilot signals that are orthogonal to each other between antennas signals and used by a receiver for separating the signals transmitted from all of the transmitting antennas from each other. The SIR measuring apparatus comprises a signal energy measuring unit, an interference energy measuring unit and a SIR measuring unit. The signal energy measuring unit measures signal energy by synthesizing after coherently integrating and non-coherently integrating values that are obtained by correlating a received signal with pilot patterns equal to the pilot patterns of transmitted antenna signals, respectively. The interference energy measuring unit measures interference energy by coherently integrating and non-coherently integrating after correlating the received signal with another pattern that is orthogonal to the pilot patterns of the transmitted antenna signals but is not transmitted. The SIR measuring unit measures SIR by using the measured signal energy and the measured interference energy.

17 Claims, 7 Drawing Sheets

U.S. PATENT DOCUMENTS 6,404,826 B1    6/2002   Schmidl et al.
6,473,451 B1 * 10/2002   Seki et al. .................. 375/142
6,680,727 B1 *  1/2004   Butler et al. ................ 375/144
6,832,073 B1 * 12/2004   Jang et al. ................ 455/67.13
6,885,694 B1 *  4/2005   He et al. .................... 375/144

OTHER PUBLICATIONS

Siemens, "Downlink interference measurement method using reserved code", TSG-RAN Working Group 1 meeting #7, 2 pages.

* cited by examiner

APPARATUS FOR MEASURING SIGNAL-TO-INTERFERENCE RATION IN MULTIPLE ANTENNA HIGH DATA RATE PACKET TRANSMISSION SYSTEM AND METHOD THEREOF

FIELD OF THE INVENTION

The present invention relates to an apparatus for measuring signal-to-interference ratio (SIR) in a multiple antenna high data rate packet transmission system and a method thereof, and, more particularly, to an apparatus for measuring SIR by using pilot patterns for separating signals of multiple antennas in a transmitting/receiving system that uses pilot signals orthogonal to each other between transmitting antennas for a receiver to separate signals from the transmitting antennas.

PRIOR ART OF THE INVENTION

As demand for high data rate forward link data packet service such as internet in wireless environment increases, High Speed Downlink Packet Access (HSDPA) specification is in progress in Wideband Code Division Multiple Access System (W-CDMA).

In HSDPA, Adaptive Modulation and Coding (AMC) technique is employed, which adjusts modulation level e.g., M-PSK where M is 4 or 16 and channel coding rate adaptively depending on channel state to maximize channel throughput.

To employ AMC, a receiver should measure Signal-to-interference ratio (SIR) as channel quality and feedback the measured SIR to a transmitter. However, inaccurate SIR information could lead waste of wireless resources or high packet error rate to result in a problem such as increase of wireless link load due to request for, e.g., retransmission.

Conventionally, SIR is typically measured by using reference energy of an automatic gain controller (AGC) in power control.

This method has no problem in low speed voice data. However, in HSDPA service environment, i.e., in channel environment where packets of high power, high data rate and plural multiple code channels are transmitted, SIR is inaccurately measured to occur a problem.

Accordingly, there has been suggested various methods for solving this problem. As an example, in Korean publication patent No. patent 1999-0043692, titled as "Apparatus and method for measuring Signal-to-interference ratio in, Code division multiple access system," filed by Samsung electronics Co., published in June, 1999, forward channels are separated with codes orthogonal to each other and a terminal has specific orthogonal codes, among the orthogonal codes, that are not assigned to the forward link by a base station and the terminal de-spreads a received signal with the non-assigned specific orthogonal codes to measure power of interference component.

In other documents "Proposed for Downlink Interference Measurement Method," revised, Ericsson, TSG-RAN Working Group 1 Meeting No. 5, TSGR1#5 (99)644, June, 1999, and "Downlink Interference Measurement Method using Reserved Code", Siemens, TSG-RAN Working Group 1 Meeting No. 7, TSGR1#7(99)B57, September, 1999, Ericsson and Siemens compare various methods for measuring interference in a forward (from a base station to a mobile station) wireless link at a mobile station and conclude a SIR measuring method using a reserved orthogonal code similar to the prescribed Korean patent publication no. patent 1999-0043692 as a best one.

However, the above methods have serious problems as follows. That is, as Korean patent publication No. patent 1999-0043692 discloses from line 16 in its detailed description of the invention, the terminal should know which orthogonal codes are not assigned to the forward link. This may be accomplished by preventing predetermined Nw orthogonal codes from being assigned to the forward link. In this case, any base station cannot assign the predetermined orthogonal codes to the forward link. Otherwise, each base station may notify the non-assigned orthogonal codes by using a message such as a system parameter message of sync channel or paging channel directed to the terminal.

However, in system operation, predetermination of non-assigned orthogonal codes leads waste of forward wireless link resources. To avoid this, during service operation of the system, the base station informs the mobile station about the non-assigned code channels that are not used currently for service so that the terminal can measure the interference by using the non-assigned codes.

However, this method leads waste of the wireless resources due to traffic load of the wireless message. Accordingly, because of the above problems, the reserved code methods are not reflected in the current W-CDMA specification (see, "Technical Specification Group-Radio Access Network: Physical Layer-Measurements," 3GPP, TR25.231, v0.3.0, June, 1999).

In brief, the SIR measuring method using AGC reference energy for the conventional voice service has a problem in wireless data service environment such as high speed internet in wireless environment. The reserved orthogonal code methods for solving the problem have another problem in system operation.

SUMMARY OF THE INVENTION

It is an object of the present invention to provide an apparatus for measuring SIR in a multiple antenna high data rate packet transmission system for measuring signal energy to interference energy ratio by using pilot signals that are orthogonal to each other between antennas signals and used by a receiver for separating the signals transmitted from all of the transmitting antennas from each other.

In accordance with an aspect of the present invention, there is provided a signal-to-interference ratio measuring apparatus of a multiple antenna high data rate packet transmission system in a transmitting/receiving system using pilot signals orthogonal between transmitting antennas for separating signals of transmitting antennas from each other at a receiver, comprising: a signal energy measuring unit for measuring signal energy by synthesizing after coherently integrating and non-coherently integrating values that are obtained by correlating a received signal with pilot patterns equal to the pilot patterns of transmitted antenna signals, respectively; an interference energy measuring unit for measuring interference energy by coherently integrating and non-coherently integrating after correlating the received signal with another pattern that is orthogonal to the pilot patterns of the transmitted antenna signals but is not transmitted; and a signal-to-interference ratio measuring unit for measuring signal-to-interference ratio by using the measured signal energy and the measured interference energy.

In accordance with another aspect of the present invention, there is provided a signal-to-interference ratio measuring method for use in a signal-to-interference ratio measuring apparatus using pilot signals orthogonal between transmitting antennas for separating signals of transmitting antennas from each other at a receiver, the method comprising the steps of: (a) measuring signal energy by synthesizing after coherently integrating and non-coherently integrating values that are obtained by correlating a received signal with pilot patterns equal to the pilot patterns of transmitted antenna signals, respectively; (b) measuring interference energy by coherently integrating and non-coherently integrating after correlating the received signal with another pattern that is orthogonal to the pilot patterns of the transmitted antenna signals but is not transmitted; and (c) measuring signal-to-interference ratio by using the measured signal energy and the measured interference energy.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Figure 1:
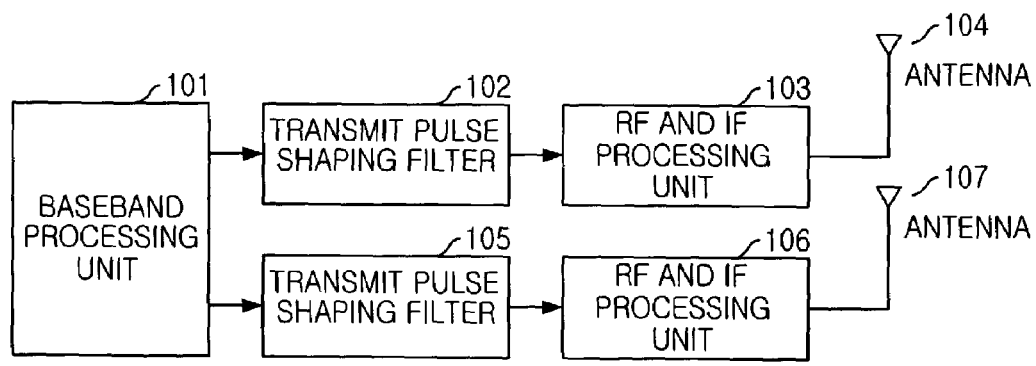
FIGS. 1 and 2 show diagrams for exemplary configuration of a multiple antenna CDMA system to which the present invention is applied.

The present invention is implemented by antenna pattern correlators, first coherent-integrating units, a signal energy measuring unit, a suppressing unit, a second coherent-integrating unit, an interference energy measuring unit, and a signal-to-interference ratio output logic. Each of the pattern correlators correlates a received signal with its pilot pattern equal to a pilot pattern of a corresponding transmitted antenna signal. Each of the first coherent-integrating units performs coherent-integration of the output of the corresponding pattern correlator. The signal energy measuring unit performs squaring and synthesizing of I and Q of the corresponding correlator output and non-coherent summation of the output of the I and Q squaring and synthesizing part. The suppressing unit correlates the received signal with another antenna pattern that is orthogonal to all of the transmitted antenna signals but transmits no signal. The second coherent integrating unit coherently integrates the output of the suppressing unit. The interference energy measuring unit performs squaring and synthesizing of I and Q of the output of he second coherent integrating unit. The signal-to-interference ratio output logic generates signal-to-interference ratio with the measured signal energy and the measured interference energy.

Common Pilot Channel (CPICH) symbol for the orthogonal antenna pattern for separating multiple antennas changes at 150 Kilo symbol per second (Ksps) in the present invention while orthogonal codes for channel separation used in the prescribed patent changes at 1.2288 Mega chips per second (Mcps) for voice service and at 3.84 Mcps for W-CDMA.

In ST Space Time Transmit Diversity (TD) that is currently applied in the specification, orthogonal pilot symbol patterns for two antennas are specified on a basis of 4 CPICH symbols. Accordingly, there are two unused orthogonal patterns, which may be used to measure interference power. Further, even if the number of the antennas is extended to 4 or 8 as well as 2, it is possible to generate orthogonal symbol patterns for separating antennas without wasting wireless resources.

For example, as similar as generation of orthogonal symbol patterns for four antennas with four symbols, orthogonal symbol patterns for 8 antennas may be generated, if necessary. At that time, coherent-integration interval should be extended to 8 symbols for a receiver to separate transmitting antenna signals from each other. Because the present invention is high data rate multiple code packet service environment, and Ling-Of-Sight (LOS) and quasi-static or low speed Doppler environment, coherent integration interval to about 1 over 8 of a Doppler period is allowed to generate orthogonal symbol pattern for antennas. Accordingly, the present invention is readily applied without inaccurate SIR or waste of wireless resources as in the conventional methods.

In this case, desired service environment of the present invention is what has plentiful LOS such as wireless Internet.

It will be described for a preferred embodiment of the present invention referring to accompanying drawings.

The present invention is applied to a system for high data rate packet transmission using multiple antennas such as a Code Division Multiple Access (CDMA) system, a High speed downlink access (HSDPA) system, a Orthogonal Frequency Division Multiple Access (OFEM) system and other systems based on them. It will be described for the multiple antenna CDMA system among them.

Figure 2:
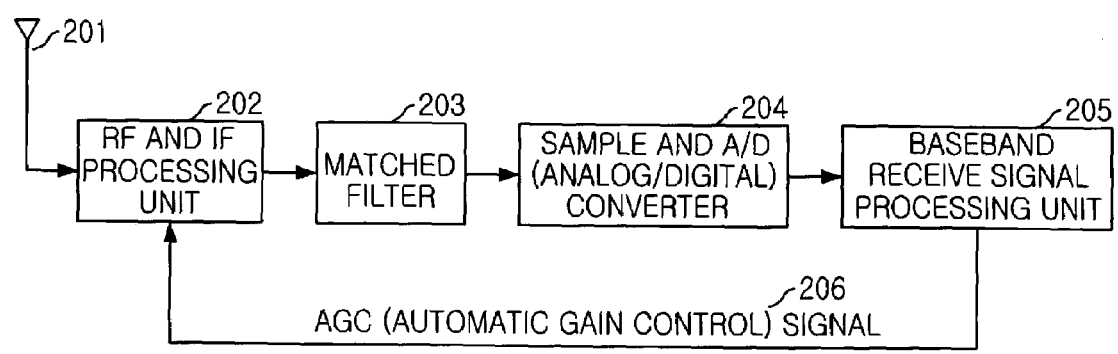
Figure 3:
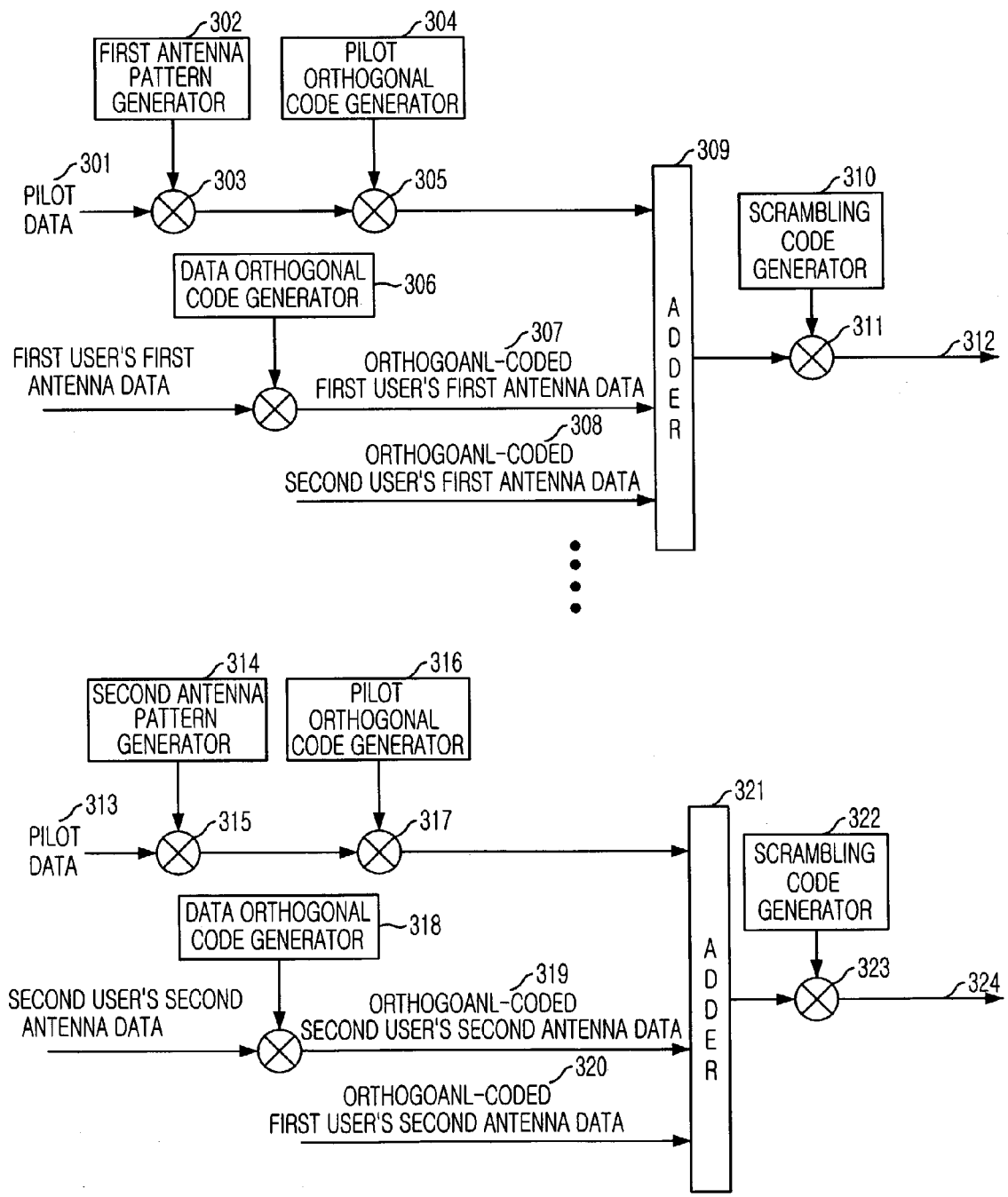
FIG. 3 offers a detailed diagram for exemplary configuration of a baseband transmit signal processing unit in a transmitter of a multiple antenna CDMA system to which the present invention is applied.
Figure 4:
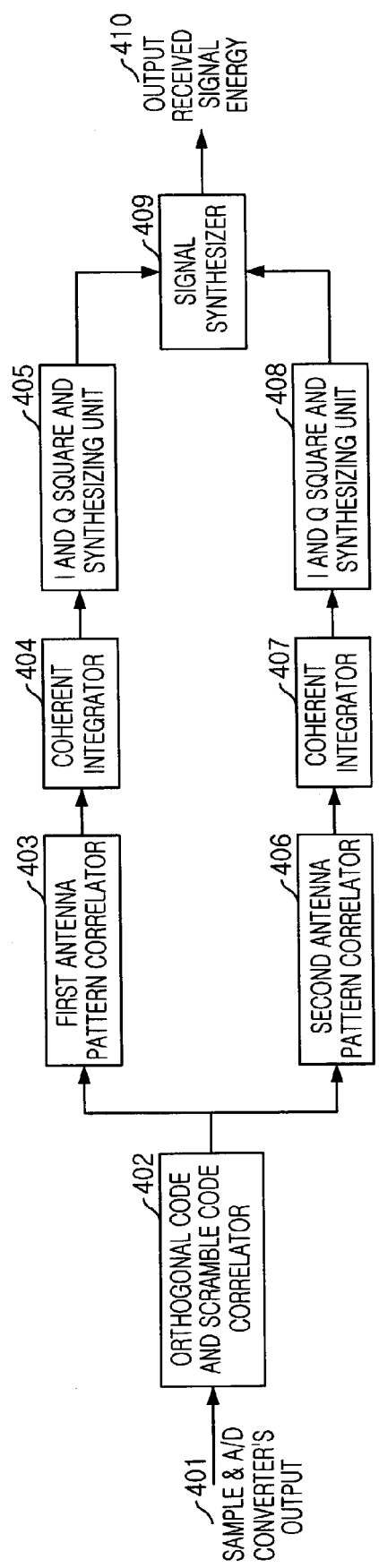
FIG. 4 offers a detailed diagram for exemplary configuration of a baseband receive signal processing unit in a receiver of a conventional multiple antenna CDMA system.

FIGS. 1 and 2 are diagrams for exemplary configuration of a multiple antenna CDMA system to which the present invention is applied. FIG. 3 offers a detailed diagram for exemplary configuration of a baseband transmit signal processing unit in a transmitter of the multiple antenna CDMA system to which the present invention is applied. FIG. 4 offers a detailed diagram for exemplary configuration of a baseband receive signal processing unit in a receiver of a conventional multiple antenna CDMA system.

That is, FIG. 1 represents configuration of the transmitter of the multiple antenna CDMA system to which the present invention is applied. FIG. 2 represent configuration of the receiver. FIG. 3 represent in detail the baseband transmit signal processing unit for each of a first and a second antennas. FIG. 4 represents the conventional baseband receive signal processing unit in the receiver in FIG. 2.

FIGS. 1 to 4 are described conjunctionally because FIGS. 1 to 4 are related to each other.

As shown in FIGS. 1 and 2, a multiple transmit antenna system is used in a W-CDMA system. For a base station transmit signal, CPICH, user data channel referred to as Dedicated Physical Channel (DPCH) and other user channel are added for the respective antennas at a baseband processing unit 101, the added signal goes through transmit pulse shaping filters 102, 105 for the respective antennas, the filtered signals are piggybacked in a carrier at Radio Frequency (RF) and Intermediate Frequency (IF) processing units 103, 106, and are transmitted from the antennas 104, 107. The transmitted signal is expressed in the following Eq. (1).

Next, it will be described for receiving process in conjunction with FIGS. 2 and 4.

The transmitted signals reach a mobile station receive antenna 201 as shown in FIG. 2 via wireless channel. The received signal passes through a RF and IF processing unit 202 and a matched filter 203 and converted to a digital signal at a sample and Analog/Digital (A/D) converter 204 with a chip period. The digital signal is inputted to a baseband receive signal processing unit 205.

The baseband receive signal processing unit 205 squares the received digital signal for every sample and takes a mean value of the squares as entire receive energy and transfers an Automatic Gain Control (AGC) signal 206 to the RF and IF processing unit 202 to maintain the mean value constantly.

$$T(t) = \sum T_a^{N_a}(t) \qquad \text{Eq. (1)}$$

$$T_a(t) = Re\{S_a(t)\}\cos 2\pi f_c t - Im\{S_a(t)\}\sin 2\pi f_c t$$

$$S_a(t)\} = \left[\sqrt{(E_{c,cp}/2N_a)}\, A_a(t'')d_{cp}(t')w_{cp}(t') + \sqrt{(E_{c,dp}/2N_a)}\, d_{a,dp}(t')w_{dp}(t') + \sum_{j=1}^{N_a}\{\sqrt{(E_{c,oc,j}/2N_a)}\, d_{a,oc,j}(t')w_{oc,j}(t')\}\right]c(t')^*f(t)\Big|_{t'=t-nT_c, t''=t-kT_s}$$

where $f_c$ is a carrier frequency and s(t) is a baseband equivalent complex signal model. $N_a$ is the number of the transmitting antennas, $E_{c,cp}$ and $E_{c,dp}$ are chip energy of the CPICH and the DPCH, respectively, $E_{c,oc,j}$ is chip energy of j-th Orthogonal Code Noise Simulator (OCNS). $w_{cp}$ and $w_{dp}$ are Orthogonal Variable Spreading Factor (OVSF) codes of the CPICH and the DPCH, respectively, $w_{oc,j}$ is an OVSF code of j-th OCNS, $d_{cp}$ is data signal of the CPICH, all being 1+j, and $d_{a,dp}$ and $d_{a,oc,j}$ are complex data signals of the DPCH and the j-th OCNS for antenna a, respectively. $A_a(t'')|_{a=1,2}$ is antenna pattern for the CPICH antennas 1 and 2 and changing at symbol period. $c(t')=c^{(I)}(t')+j\, c^{(Q)}(t')$ is a complex scrambling code and f(t) is the impulse response of the pulse shaping filter.

For apprehension of the transmitted signal as represented by Eq. (1), it will be described for the baseband transmit signal processing unit 101 for the first and the second antennas as shown in FIG. 3.

First, pilot data 1+j 301, 313 are patterned with the output of the first antenna pattern generator 302 and the output of the second antenna pattern generator 314 ($A_a(t'')|_{a=1,2}$ in Eq. (1)), respectively, and then orthogonal-coded with the outputs of ($w_{cp}$ in Eq. (1)) for separating from other data channels. Then, The orthogonal-coded signals are summed with other orthogonal-coded user antenna data 307, 308, 319, 320 at summers 309, 321 and then scrambled with outputs of scrambling code generators 310, 322 (c(t') in Eq. (1)). The resultant signals are transmitted.

It will be described in detail in conjunction with FIG. 4.

After passing through the matched filter 203 and the sample and A/D converter 204, the signal 401 that is inputted to the baseband receive signal processing unit 205 goes through the orthogonal code and scramble code correlator 402 and than de-patterned to remove CPICH pattern to separate the received signal for each antenna at the first and the second antenna pattern correlators 403, 406. This signal is expressed in Eq. (2)

$$X_a(n, k) = \left[\sqrt{(E_{c,cp}/2n_a)}\, A_{a,k} d_{cp,n} w_{cp,n} + \sqrt{(E_{c,dp}/2n_a)}\, d_{a,dp,n} w_{dp,n} + \sum_{j=1}^{} \{\sqrt{(E_{c,oc,j}/2n_a)}\, d_{a,oc,j} w_{oc,j,n}\}\right] c_n R(\tau) g_{c_n}^* \underset{w_{cp,n}}{g} \underset{A_{a,k}}{g} + n_n \qquad \text{Eq. (2)}$$

In Eq. (2), the signals with notation ^ are locally generated code signals. In Eq. (2), time index of CPICH antenna pattern is represented as symbol rate k. The output of the matched filter is assumed to be sampled at a point $\tau=0$ for convolution function $R(\tau)$ between the pulse shaping filters 102, 105 and the matched filter 203, i. e., at a maximum energy point during every chip period(optimum sampling). Accordingly, this value becomes '1'. $n_n$ is a random process of a function of sample time n of complex additive white Gaussian sample having a variance $N_0$.

With assumption of the mean of common pilot received signal energy as $Z_k$, consider a case of only one antenna ($N_{a=1}$) to obtain this mean. When local scramble code phases are equal to each other, means of integrated output signals of which symbols are synchronized with each other are given as the following Eqs. (3) and (4).

$$Z_k = E[C_{0,0}] = E\left[\left\{\sum \text{Re}\left(\sum_{i=1}^{N} B_i + n_i\right)\right\}^2 + \left\{\sum \text{Im}\left(\sum_{i=1}^{N} B_i + n_i\right)\right\}^2\right] \quad \text{Eq. (3)}$$

$$B_i = \left\{\sqrt{E_{c,cp}/2}\, d_{cp,i} w_{cp,i} + \sqrt{E_{c,dp}/2}\, d_{dp,i} w_{dp,i} + \sum \sqrt{E_{c,oc,j}/\sum_{j=1}^{2}}\, d_{a,oc,j} w_{oc,j,n}\right\} c_j g_{c_i}^* \underset{w_{cp,i}}{g} \quad \text{Eq. (4)}$$

Since $\frac{1}{N}\sum_{i=1}^{N} c_i \underset{c_i w_{cp,i}}{g^*} \underset{w_{cp,i}}{g} = 1$, $\sum_{i=1}^{N} c_i \underset{c_i w_{dp,j}}{g^*} \underset{w_{cp,j}}{g} = \sum_{i=1}^{N} c_i \underset{c_i w_{ocj,i}}{g^*} \underset{w_{cp,i}}{g} = 0$ and $d_{cp,i} = 1 + j$, the above Eqs. (3) and (4) are equal to the following Eq. (5).

$$E[C_{0,0}] \% E\left[\left\{N\sqrt{E_{c,cp}} + \sum_{n=1}^{N} n_n\right\}^2\right] = N^2 E_{c,cp} + N\sigma_n^2 \quad \text{Eq. (5)}$$

where $\sigma_n^2$ is interference power spectrum density, $E[n(t)n(t')] = E[n_I(t)n_I(t')] = E[n_I(t)n_I(t')] + E[n_Q(t)n_Q(t')] = I_o \delta(t+t')$, where $\delta(\ )$ is a Dirac-delta function.

Because SIR is proportional to Chip energy over interference power spectral density $E_c/I_0$, they are referred to as a same term in the following.

There are typically considered two methods for measuring $E_c/I_0$. One of them uses ACC reference energy in interference energy measurement and the other calculates a mean value of squares of all samples of the received digital signal.

Since AGC maintains mean energy of squares of all samples of the received digital signal as a reference value constantly, the two methods are equal to each other. Accordingly, the two methods are referred to as a typical method.

Let $A_0$ be AGC reference energy, $A_0$ is given as the following Eq. (6) because the AGC reference energy is accumulated during $N=4N_s$ chips, i.e., common pilot coherent integration length.

$$A_0 = 4N_S E_{AGC-ref} = 4N_S \left(\sigma_n^2 + E_{c,dp} + \sum_{j=1}^{} E_{c,oc,j}\right) \quad \text{Eq. (6)}$$

Assuming that $$\sigma_n^2 \gg E_{c,cp} + E_{c,dp} + \sum_{j=1}^{} E_{c,oc,j}$$

in Eq. (6), expected $E_c/I_0$ is given as the following Eq. (7) from Eqs. (5) and (7).

$$est(E_e/I_0) = \frac{1}{4N_S}\left(\frac{E[C_{0,0}]}{A_0} - 1\right) \quad \text{Eq. (7)}$$

The assumption $$\sigma_n^2 \gg E_{c,cp} + E_{c,dp} + \sum_{j=1}^{} E_{c,oc,j}$$

in operation for Eq. (7) in the typical method makes sense in an environment where base station transmit total energy to interference energy from other cells and thermal noise ratio (hereinafter, it is referred to as $I_{or}/I_{oc}$) is small, i. e., when the terminal is located near the boundary of the cell or cell load of transmit energy at the base station is low, ($E_{C,OCNS}$% 0) can be assumed with no significant error.

However, when the terminal moves toward the center of the cell or cell load is high (e. g., $$\sum_{j=1}^{} E_{o,oc,j}/I_{or} = -1 \text{ dB},$$

about 80 percent of total $I_{or}$), the above assumption does not make sense. In particular, because HSDPA environment is high data rate, high power near the base station and transmits in plural multiple code channel condition, i.e., high cell load condition, bias error occurs in the conventional method, which can be given the following Eq. (8).

$$\text{bias error } E_{-Bias} = 10\log_{10}\left(\frac{x + N_a/N}{x(1 + y(1+\rho))} - \frac{N_a}{Nx}\right) \quad \text{Eq. (8)}$$

where x, y are $E_c/I_0$ and $I_{or}/I_{oc}$ received at the receiver, respectively, $N_a$ is the number of antennas, $\rho$ is a correlation coefficient between antenna paths, and N is coherent integration length.

In order to eliminate bias error, the present invention uses pilot pattern orthogonal between antennas, which will be described below.

Figure 5:
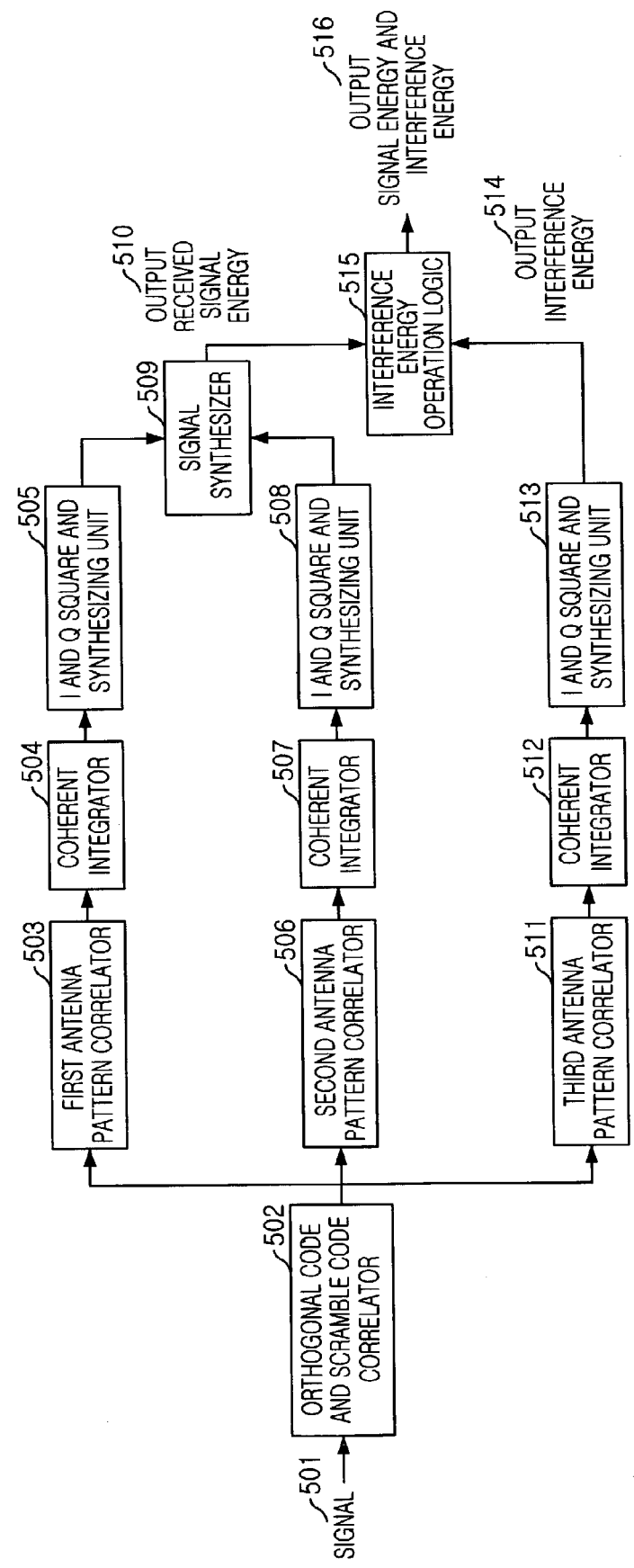
FIG. 5 is a diagram for configuration of an embodiment of a signal-to-interference ratio measuring apparatus in the multiple antenna high data rate packet transmission CDMA system in accordance with the present invention.

FIG. 5 is a diagram for configuration of an embodiment of a signal-to-interference ratio measuring apparatus in the multiple antenna high data rate packet transmission CDMA system in accordance with the present invention.

In FIG. 5, the baseband receive signal processing unit in FIG. 4 is re-configured according to the present invention. Some elements of FIG. 5 are compared with those of which functions are similar to them to understand the present invention more readily.

Let pilot symbol pattern outputted from the first antenna pattern generator 302 be (A, A, A, A) and pilot symbol pattern outputted from the second antenna pattern generator 314 be (A, −A, −A, A). Let A be a constant, for example, 1, then the patterns correspond symbol $w_0^{(4)}$, $w_3^{(4)}$ of index 0 and 3 of Walsh order 4, respectively.

At the baseband receive signal processing unit 205 of the receiver, the signal from the orthogonal code and scramble code correlator 402, 502 is correlated by using the antenna pattern of the first antenna pattern correlator 403, 503, which is equal to the pilot symbol pattern from the first antenna pattern generator 302 of the transmitter. Similarly, at the baseband receiving signal processing unit 205 of the receiver, the signal from the orthogonal code and scramble code correlator 402, 502 is correlated by using the antenna pattern of the second antenna pattern correlator 406, 506, which is equal to the pilot symbol pattern from the second antenna pattern generator 314 of the transmitter. The correlated signals go through the corresponding coherent integrators 404, 407, 504, 507, respectively, and the I and Q square and synthesizing units 405, 408, 505, 508. Then, the outputs of the I and Q square and synthesizing units 405, 407, 505, 508 are synthesized non-coherently to output received signal energy 410, 510.

On the other hand, the signal from the orthogonal code and scramble code correlator 402, 502 is correlated by using a third antenna pattern that is orthogonal to the first antenna pattern and the second antenna pattern at the correlator 511 and then go through the coherent integrator 512 and the I and Q square and synthesizing unit 513 to output interference energy 514.

The received signal energy output 510 and the received interference energy output 514 is processed to output the received signal energy to interference energy at the received signal energy to interference energy operation logic 515 represented as Eq. (10).

This process will be described in detail in the following with equations. First, consider a case of only one antenna before a case of two or more antennas. In the case that the transmitting antenna pattern is (A, A, A, A), the interference energy is calculated as follows. That is, the output of the correlator, which is de-patterned with $w_2^{(4)}$, is squared for its I and Q components, respectively. The mean of the squared values is represented as the following Eq. (9).

$$E[C_{0,2}] = E\left[\left\{\sum_{i=0}^{N-1}\left(\sqrt{E_c}+n_i\right) - \sum_{i=N}^{2N-1}\left(\sqrt{E_c}+n_i\right) - \sum_{i=2N}^{3N-1}\left(\sqrt{E_c}+n_i\right) - \sum_{i=3N}^{4N-1}\left(\sqrt{E_c}+n_i\right)\right\}^2\right]$$ Eq. (9)

Because $C_{0,0}$, a value correlated with Walsh pattern equal for each CPICH antenna, substitutes N to $4N_s$ in Eq. (5) and $C_{0,2}$, a value correlated with other Walsh pattern, is given as Eq. (9), the expected value of $E_{c/I_0}$ can be obtained by using ratio of energy mean, which can be expressed as the following Eq. (10)

$$\frac{E[C_{0,0}]}{E[C_{0,2}]} = \frac{(4N_s)^2 E_c + 4N_s\sigma_n^2}{4N_s\sigma_n^2} \text{ test }\left(\frac{E_c}{I_0}\right) = \frac{1}{4N_s}\left(\frac{E[C_{0,0}]}{E[C_{0,2}]} - 1\right)$$ Eq. (10)

Next, bias error performance of the typical method and an embodiment of the present invention are estimated. Computer simulation condition for this estimation is given in Table 1 as follows.

TABLE 1

| parameter | Value | comments |
| --- | --- | --- |
| $E_{c,cpich}/I_{or}$ | −10 dB | 10 percent of $I_{or}$ |
| $E_{c,dpch}/I_{or}$ | −10 dB | 10 percent of $I_{or}$ |

TABLE 1-continued

| parameter | Value | comments |
| --- | --- | --- |
| $I_{or}/I_{oc}$ | −7~7 dB | 80 percent of $I_{or}$ |
| $\sum_{j=1}^{N_{OCNS}} E_{c,OCNS,j}/I_{or}$ | −1 dB | The number of OCNS and spreading rate are $N_{OCNS} = 4$ and SF = 16, respectively. |

Figure 6:
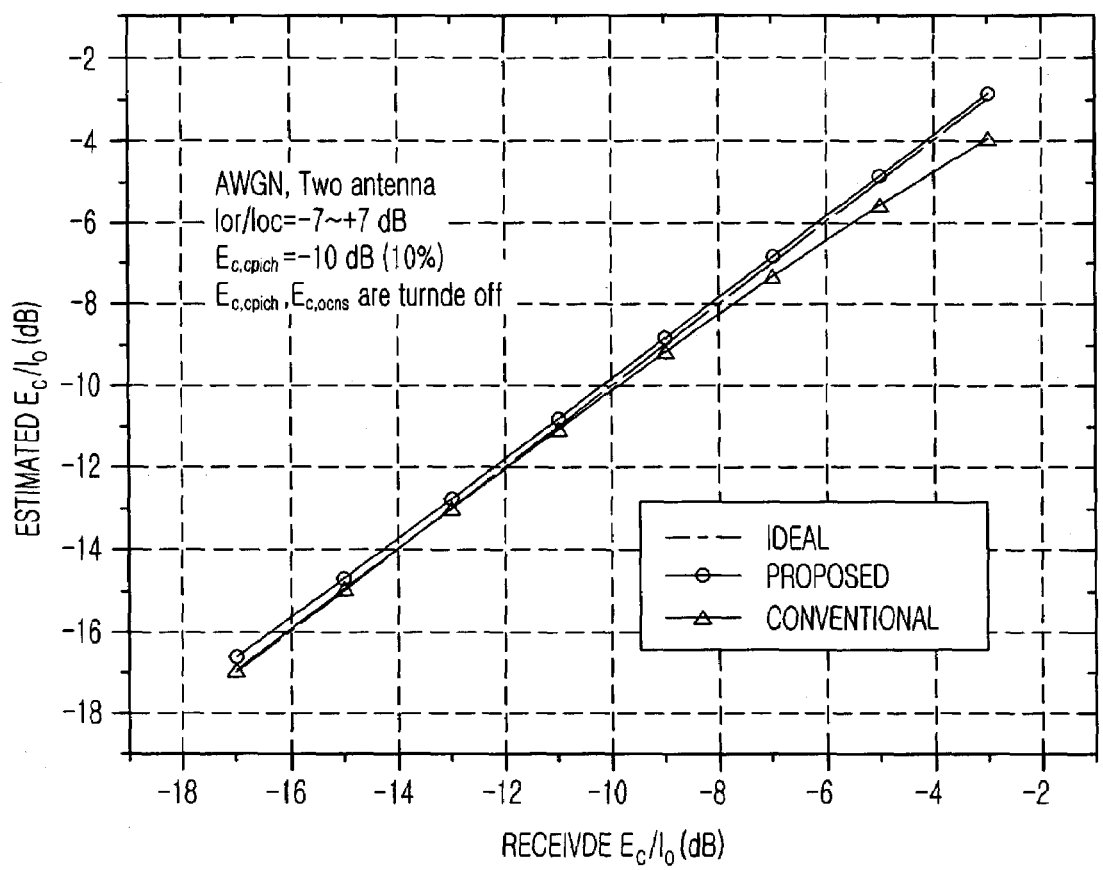
FIGS. 6 to 8 represent diagrams for describing a signal-to-interference ratio measuring method in the multiple antenna high data rate packet transmission CDMA system in accordance with the present invention.
Figure 7:
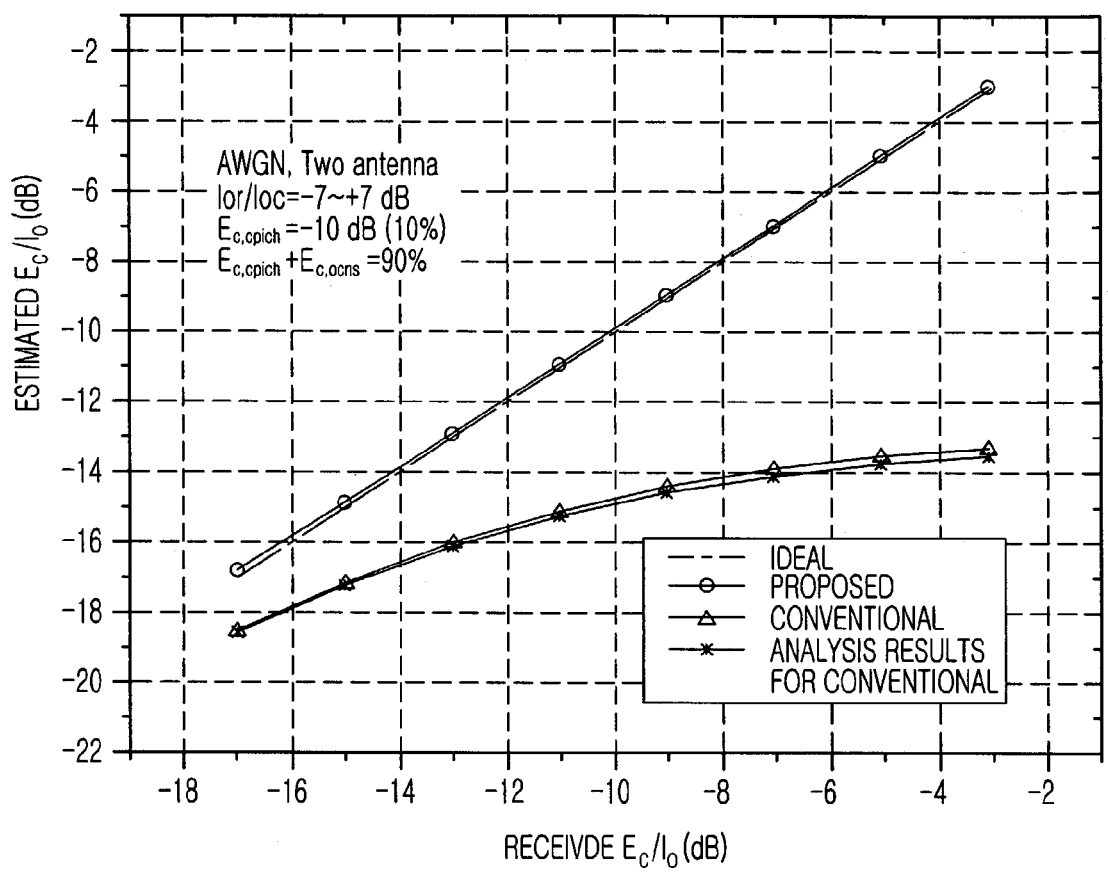
Figure 8:
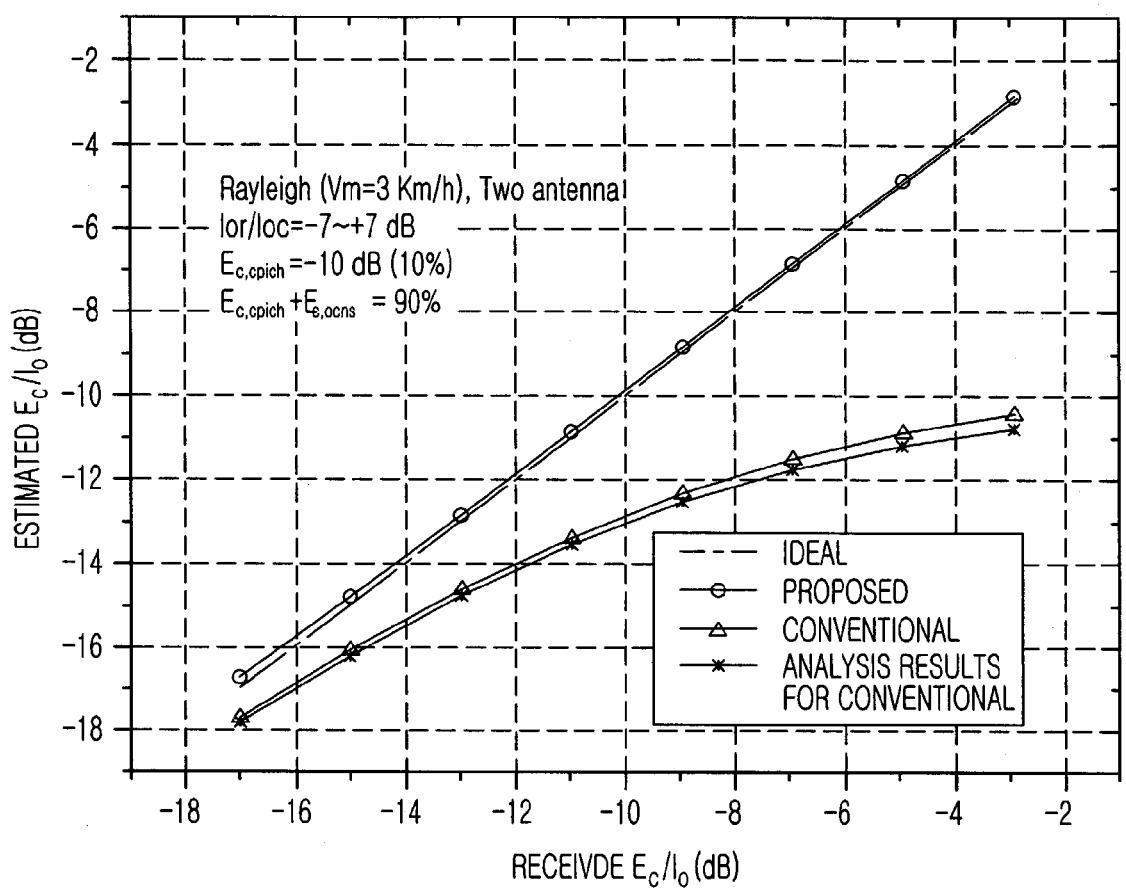

FIGS. 6 to 8 are diagrams for describing characteristic of a signal-to-interference ratio measuring method in the multiple antenna high data rate packet transmission CDMA system in accordance with the present invention.

FIG. 6 is a graph comparing signal-to-interference ratio measuring performance of the typical method and the present invention for additive white noise, space time transmit diversity mode when there is only common pilot energy. FIG. 7 is a graph comparing signal-to-interference ratio measuring performance of the typical method and the present invention for additive white noise, space time transmit diversity mode when there are plural multiple code channel energy as well as common pilot energy. FIG. 8 is a graph comparing signal-to-interference ratio measuring performance of the typical method and the present invention for Rayleigh channel noise, space time transmit diversity mode when there are plural multiple code channel energy as well as common pilot energy.

FIGS. 6 to 8 are given for two transmitting antenna system and illustrate bias error performance result of an $E_c/I_0$ expecting unit of the typical method and an $E_c/I_0$ expecting unit of an embodiment of the present invention when only CPICH energy is transmitted or both of DPCH and OCNS are transmitted in STTD(Space Time Transmit Diversity).

As shown in FIG. 6, there is little bias error (un-biased) of the $E_c/I_0$ expecting unit of the typical method and the $E_c/I_0$ expecting unit of an embodiment of the present invention.

In FIG. 7, the typical method shows about 10 dB under estimation at around 2 dB. The reason is that OCNS occupies 80% of base station transmit energy which is measured as interference so that interference component measured as high. As the received $I_{or}/I_{oc}$ increases, i. e., it becomes closer to the base station, the bias error increases.

On the contrary, the present invention is always unbiased.

FIG. 8 shows performance result of each $E_c/I_0$ expecting unit under Rayleigh channel condition (carrier frequency is 2 GHz and mobile velocity is 3 Km/hr) when OCNS occupies 80% of base station transmit energy. The typical method shows about 1 to 7 dB under estimation.

On the contrary, the present invention shows bias error less than 0.5 dB. Comparing FIG. 7 with FIG. 8, the typical method shows bias error in Rayleigh fading noise less than that in additive white Gaussian noise because of no correlation between antennas. In other words, physical quantity of the denominator in Eq. (8) is reduced because $\rho=0$ in Eq. (8). Accordingly, because LOS occupies majority in the fast HSDPA service environment that is desirable to apply the present invention and $\rho$ is closer to 1, $E_c/I_0$ expectation is deteriorated worse in the typical method.

The present invention can be applied to various high data rate packet transmission systems using multiple antennas such as a CDMA system, a HSDPA system, an OFDM system and other system based on the systems.

As described above, the present invention makes possible to accurately measure SIR in HSDPA service environment, i. e., packet transmission channel environment where high power, high data rate, plural multiple code channels are multiplexed.

Further, the present invention measures SIR by using pilot signal patterns for separating signals of multiple antennas with no problem in system operation and utility.

Further, while the typical method shows inaccurate SIR measurement due to larger LOS service environment and accompanying correlation effect between transmitted signals of transmitting antennas, the present invention can accomplish accurate measurement in this environment and can measure SIR more excellently than the typical method in any typical operation environment.

While the present invention has been shown and described with respect to the particular embodiments, it will be apparent to those skilled in the art that many changes and modifications may be made without departing from the spirit and scope of the invention as defined in the appended claims.

What is claimed is:

1. In a transmitting/receiving system using pilot signals orthogonal between transmitting antennas for separating signals of transmitting antennas from each other at a receiver, a signal-to-interference ratio measuring apparatus of a multiple antenna high data rate packet transmission system, comprising:
    signal energy measuring means for measuring signal energy by synthesizing after coherently integrating and non-coherently integrating values that are obtained by correlating a received signal with pilot patterns equal to the pilot patterns of transmitted antenna signals, respectively;
    interference energy measuring means for measuring interference energy by coherently integrating and non-coherently integrating after correlating the received signal with another pattern that is orthogonal to the pilot patterns of the transmitted antenna signals but is not transmitted; and
    signal-to-interference ratio measuring means for measuring signal-to-interference ratio by using the measured signal energy and the measured interference energy.

2. The signal-to-interference ratio measuring apparatus as recited in claim 1, wherein the signal energy measuring means includes:
    transmit antenna pattern correlating means for correlating the received signal by using the pilot symbol pattern outputted from a respective antenna pattern generator of the transmitter;
    coherent-integrating means for coherently integrating, during a predetermined sample period, multiple signals outputted through the transmitting antenna pattern correlating means;
    non-coherent-integrating means for squaring in-phase components and quadrature-phase components for the output signals of the multiple coherent-integrating means; and
    signal synthesizing means for measuring signal energy by synthesizing the multiple output signals from the non-coherent-integrating means.

3. The signal-to-interference ratio measuring apparatus as recited in claim 2, wherein the numbers of the transmitting pattern correlating means, the coherent-integrating means and the non-coherent-integrating means correspond to the number of the antenna patterns transmitted from the transmitter.

4. The signal-to-interference ratio measuring apparatus as recited in claim 1, wherein the interference energy measuring includes:
    interference energy measuring antenna pattern correlating means for correlating the received signal by using another pattern that is orthogonal to the pilot symbol pattern transmitted from a respective antenna pattern generator of the transmitter;
    interference energy measuring coherent-integrating means for coherently integrating, for a predetermined sample period, signal outputted through the interference energy measuring antenna pattern correlating means; and
    interference energy measuring non-coherent-integrating means for measuring interference energy by squaring in-phase component and quadrature component of the output signal of the interference energy measuring coherent-integrating means.

5. The signal-to-interference measuring apparatus as recited in claim 1, wherein the interference energy measuring means generates a signal having another antenna signal pattern that is orthogonal to the pilot pattern of each of the transmitted antenna signals but is not transmitted, multiplies the generated signal with in-phase and quadrature signals, i. e., a complex input signal, accumulates the in-phase and quadrature signals, respectively, and squares the in-phase and the quadrature, respectively, and adds the squaring results to measure interference energy.

6. The signal-to-interference measuring apparatus as recited in claim 1, wherein the signal-to-interference measuring means subtracts the output value of the interference energy measuring means from the measured value obtained at the signal energy measuring means, and divides the subtraction result by the output value of the interference energy measuring means to measure the signal-to-interference ratio.

7. The signal-to-interference measuring apparatus as recited in claim 1, wherein the signal-to-interference measuring means substantially subtracts the output value of the interference energy measuring means from the measured value obtained at the signal energy measuring means, divides the subtraction result by the output of the interference energy measuring means, and divides the division result by total coherent-integration length to measure the signal-to-interference ratio.

8. The signal-to-interference measuring apparatus as recited in claim 1, wherein the signal-to-interference measuring means divides the measured value obtained at the signal energy measuring means by the output value of the interference energy measuring means, subtracts 1 from the division result, and divides the subtraction result by total coherent integration length to measure the signal-to-interference ratio.

9. The signal-to-interference measuring apparatus as recited in claim 1, wherein the signal-to-interference ratio measuring means divides the measured value obtained at the signal energy measuring means by the output value of the interference energy measuring means, subtracts a value around 1 from the division result, and divides the subtraction result by total coherent integration length to measure the signal-to-interference ratio.

10. A signal-to-interference ratio measuring method for use in a signal-to-interference ratio measuring apparatus using pilot signals orthogonal between transmitting antennas for separating signals of transmitting antennas from each other at a receiver, the method comprising the steps of:
  (a) measuring signal energy by synthesizing after coherently integrating and non-coherently integrating values that are obtained by correlating a received signal with pilot patterns equal to the pilot patterns of transmitted antenna signals, respectively;
  (b) measuring interference energy by coherently integrating and non-coherently integrating after correlating the received signal with another pattern that is orthogonal to the pilot patterns of the transmitted antenna signals but is not transmitted; and
  (c) measuring signal-to-interference ratio by using the measured signal energy and the measured interference energy.

11. The signal-to-interference ratio measuring method as recited in claim 10, wherein the step (a) includes the steps of:
  (d) correlating the received signal by using the pilot symbol pattern outputted from a respective antenna pattern generator of a transmitter;
  (e) coherently integrating the multiple output signals correlated with the respective transmitting antenna pattern, during a predetermined sample period;
  (f) squaring in-phase components and quadrature components of the coherently integrated signals to measure signal energy; and
  (g) measuring the signal energy by synthesizing the multiple squared signals.

12. The signal-to-interference ratio measuring method as recited in claim 10, wherein the step (b) includes the steps of:
  (d) correlating the received signal by using another pattern that is orthogonal to the pilot symbol pattern transmitted from a respective antenna pattern generator of the transmitter;
  (e) coherently integrating, for a predetermined sample period, the correlated signal outputted through the interference energy measuring antenna pattern correlating means; and
  (f) measuring interference energy by squaring in-phase component and quadrature component of the coherently integrated signal.

13. The signal-to-interference ratio measuring method as recited in claim 10, wherein the step (b) includes the steps of:
  (d) generating a signal having another antenna signal pattern that is orthogonal to pilot pattern of each of transmitted antenna signals but is not transmitted;
  (e) multiplying the generated signal with an in-phase signal and a quadrature signal, i. e., a complex input signal, and accumulating the in-phase and quadrature signals, respectively, for a predetermined period; and
  (f) squaring the in-phase and the quadrature of the accumulated signals, respectively, and adds the squared values to measure interference energy.

14. The signal-to-interference ratio measuring method as recited in claim 10, wherein, in the step (c), the measured value of interference energy is subtracted from the measured value of signal energy, and divides the subtraction result by the measured value of the interference energy to measure the signal-to-interference ratio.

15. The signal-to-interference measuring method as recited in claim 14, wherein, in the step (c), substantially, the measured value of interference energy is subtracted from the measured value of signal energy and divides the subtraction result by the measured value of interference energy, and divides the division result by total coherent integration length value to measure the signal-to-interference ratio.

16. The signal-to-interference measuring method as recited in one of claim 10, wherein, in the step (c), the measured value of signal energy is divided by the measured value of the interference energy, subtracts 1 from the division result, and divides the subtraction result by total coherent integration length value to measure the signal-to-interference ratio.

17. The signal-to-interference measuring method as recited in claim 10, wherein, in the step (c), the measured value of the signal energy is divided by the measured value of the interference energy, subtracts a value around 1 from the division result, and divides the subtraction result by total coherent integration length value to measure the signal-to-interference ratio.

* * * * *